United States Patent [19]

Slagg

[11] Patent Number: 4,840,239

[45] Date of Patent: Jun. 20, 1989

[54] VOLUMETRIC-TO-GRAVIMETRIC-TO-VOLUMETRIC CONVERTER SCALE

[76] Inventor: James E. Slagg, 510 Sycamore Ave., South Milwaukee, Wis. 53172

[21] Appl. No.: 274,857

[22] Filed: Nov. 22, 1988

[51] Int. Cl.$^4$ ............... G01G 19/40; G01G 19/22
[52] U.S. Cl. ........................... 177/25.14; 177/1; 177/70
[58] Field of Search ............ 177/25.14, 25.16, 1, 177/70

[56] References Cited

U.S. PATENT DOCUMENTS

| | | | |
|---|---|---|---|
| 4,119,162 | 10/1978 | Ackeret | 177/174 X |
| 4,244,020 | 1/1981 | Ratcliff | 177/25.16 |
| 4,362,219 | 12/1982 | Carlsson | 177/245 |

Primary Examiner—George H. Miller, Jr.
Attorney, Agent, or Firm—Fuller, Puerner & Hohenfeldt

[57] ABSTRACT

A scale adapted for performing recipes in which the ingredients are given in customary volumetric measures such as cups, tablespoons and teaspoons. The user enters the name or code number of an ingredient which is displayed by the scale. The amount of the ingredient is displayed in volumetric terms or in terms of weight if desired. A processor in the scale accesses the volume-to-weight (V/W) ratio or weight-to-volume (W/V) ratio of the ingredient from nonvolatile memory and calculates the weight of the ingredient and stores it temporarily. The ingredient is added gradually to a mixing bowl on the scale after the tare weight of the bowl is cancelled. The processor continuously compares the stored weight with the increasing weight of the ingredient and notifies the user by means of the display when a comparison is read and, hence, when the desired volumetric amount of the ingredient has been entered. Other operating modes can also be selected.

25 Claims, 3 Drawing Sheets

$\underline{Fig. 2}$

Fig. 3

VOLUMETRIC-TO-GRAVIMETRIC-TO-VOLUMETRIC CONVERTER SCALE

BACKGROUND OF THE INVENTION

The invention disclosed herein pertains to a scale that displays recipe ingredients or other materials placed on its pan in terms of their volume and it also functions conventionally to display the weight of any substance in terms of metric or English units of measurement. Conceptually, the invention may be considered to be a volumetric-to-gravimetric-to-volumetric converter in one mode and a volumetric-to-gravimetric converter in another mode.

Most food recipes published in the United States express ingredients in volumetric terms such as cups or fractions of a cup, tablespoons or teaspoons and fractions of tablespoons and teaspoons. Measuring ingredients in terms of volume is often inaccurate and can result in baked or cooked products sometimes tasting, looking or feeling different from one production of the recipe to another. A cake, for example, can be considered a failure if it rises too much or simply flops flat like a pancake as a result of too much or too little of an ingredient. Cooks and bakers who may have performed a particular recipe many times, supposedly measuring the same amounts of the ingredients, can be mystified by the fact that on some occasions the result of the recipe is pleasing and on other occasions it is disappointing. A volumetric-to-gravimetric-to volumetric converter can solve the problem.

A study has revealed that variations in the quality of baked and cooked products in the home results primarily from inaccurate measurements of the ingredients of the recipe. The person doing the cooking or baking is not necessarily to blame. The problem results from recipes specifying ingredients in terms of volume instead of, more accurately, in terms of weight. For example, a recipe may call for a cup of an ingredient which is traditionally available in granular form. The cook or baker happens to be using a powdered form of the ingredient. The weight of the same materials can be different for identical volumes because the packing factors can be different which results from there being larger voids in a cup of the coarser material. So, on one occasion, the recipe may get too much of an ingredient when it is in one physical form and on other occasions, too little of the ingredient when it is in another physical form. This is true of materials such as brown sugar, which may be lumpy at one time and finely divided at other times. Flour from different sources can have significant packing density variations. This is true of many finely divided materials as well as granular materials.

Data published by the United States Department of Agriculture reveal substantial variations in the weight, and hence, the quantity of the ingredient in a given volume recited in the recipe. The data are presented in "Average Weight of a Measured Cup of Various Foods", Agricultural Research Service of the U.S. Department of Agriculture, Home Economics Research Report No. 41 which is now out of print but is on U.S. Government Printing Orrice bookstore records. Large variations in weight and, hence, quantity may result simply from the way in which an ingredient is prepared such as whether it is canned, frozen, bottled or dehydrated. Measuring an ingredient in different ways such as by dipping or spooning can cause variations. The inference to be drawn from the foregoing is that higher accuracy and better results in cooking and baking may be obtained by adding ingredients gravimetrically, that is, in terms of their weights rather than volumetrically, or in terms of their volume. Up to the time the invention disclosed herein was made, there has been no volumetric-to-gravimetric converter type of scale device available nor has there been a volumetric-to-gravimetric-to-volumetric converter type of scale available that would afford a cook or baker an opportunity to add ingredients to a recipe mixture where the recipe calls for specified volumes of the ingredients and where the scale would weigh the ingredient and display its amount in terms of volume rather than in terms of weight as conventional scales do or wherein the cook or baker can enter into the scale the volume of an ingredient called for in a recipe or formula and have the scale convert the volume to weight and then display the volume value that was entered originally.

Errors can also be made in measuring quantities of liquid ingredients listed in a recipe. A measuring cup is often held in one hand by the cook or baker while a liquid ingredient is being poured into the cup. The cup may be raised to eye level to see if the level of the liquid is up to the proper graduation mark on the cup. If the cup is not level, a substantial error can result from the liquid being level and the cup being angulated. Even if the cup is placed on a flat surface, as it should for measuring a liquid, there can be an error due to the top edge of the meniscus being higher than the overall level of the liquid. Since the meniscus remains constant for any level of the same liquid in a measuring cup or other measuring instrument, the percentage error becomes greater and greater as the quantity of the liquid being measured becomes smaller.

Other errors in adding solid and liquid ingredients to a recipe mixture can result from not clearing out all of the ingredient from the volume measuring device. For example, if a substance such as honey is measured in a tablespoon or measuring cup, some of it may adhere to the measuring device when it is poured into a recipe mixing bowl. The error can be enlarged by using the same measuring device for the next ingredient to be added, in which case some of the former ingredient might take the place of some of the present ingredient. The latter error can, of course, be avoided if the cook or baker interrupts progress of the recipe to wash and dry the measuring device or devices between using it or them for successive ingredients. An alternative solution is to keep several of each type of measuring device on hand so the devices can be used alternatively and finally cleaned up after the recipe is complete. Neither solution is satisfactory.

SUMMARY OF THE INVENTION

Objectives of the present invention are to provide a volumetric-to-gravimetric converter that can be used like a weighing scale and a method of producing recipes that can substantially reduce and even, in some cases, eliminate the need for volumetric measuring devices for producing a baked or cooked product in accordance with a recipe.

Another important object is to increase the accuracy and repeatability of measurements of recipe ingredients or other materials while still allowing the user to use the recipes in which ingredients are expressed in terms of volume as is conventional.

A further object is to provide an electronic volumetric-to-gravimetric converter, that can be called a converter scale for the sake of brevity, which contains a processor and stores the proportionality ratios, that is, the volume-to-weight (V/W) ratios and/or the weight-to-volume W/V ratios of a multitude of cooking and baking ingredients and/or ingredients for mixed drinks which, by reason of the operating mode of the scale, allows the user to put each ingredient, specified in the recipe in terms of volume, into a mixing bowl or other appropriate container directly from a bag, package, box or bottle and to provide for the converting scale indicating when enough of the particular ingredient has been introduced by displaying the increasing volume of the ingredient as more of the ingredient is being added to a container on the pan of the scale. In another selectable mode, the converter scale displays initially the volume of the ingredient which has been identified and then has the volume display decrease toward zero (0) as more of the ingredient is added.

Another objective is to facilitate preparing more than one quantity of the same recipe concurrently or less than a full recipe by using keys on the keyboard to select a multiplying operating mode and the multiple or submultiple of the recipe desired and have the computer in the scale do the multiplying and displaying of the quantity of the ingredient that is to be added.

Another objective is to provide the option, selectable by way of a key on the keyboard of the scale, to display the weight of a recipe component or ingredient that is being placed on the scale.

Another objective is to provide for the scale user to store, by using the keyboard of the scale, volume-to-weight (V/W) ratios or W/V ratios for recipe ingredients that have not been stored in the scale previously such as when the scale was manufactured.

Another objective of the invention is to provide a scale capable of displaying materials in terms of their volume when producing a recipe such as for cocktails or other beverages that are prepared in places such as taverns. A corollary to this objective is to provide a scale which can be used advantageously in a chemical laboratory, for instance, where it is most convenient to let the scale weigh a substance and yet have the amount of the substance be displayed in terms of its volume as it is expressed in a formula or recipe.

Briefly stated, the new volumetric-to-gravimetric-to-volumetric converter scale (hereafter called a converter scale) has some of the characteristics of a conventional electronic scale, that is, it has the capability of doing ordinary weighing and displaying weight in English or metric units on a display screen or panel. Transducer means produce an electric signal corresponding to the weight of the material placed on the pan of the scale. There is a processor, preferably based on a microprocessor, in the converter device. A new feature is that proportionality factors, that is, the volume-to-weight (V/W) ratios or, optionally the weight-to-volume W/V ratios, of many ingredients, in fact, hundreds of ingredients in the deluxe or more advanced model of the converter scale that are frequently used in cooking recipes are stored in a suitable storage medium, such as in a programmable read-only memory (PROM).

For the sake of brevity, for the most part the construction and function of the new scale will be described as if the V/W proportionality factors or ratios are in storage. A keyboard is provided for the user to indicate the ingredient that is to be added and the amount in term of volume of the ingredient that is required by the recipe or formula. After some preliminary steps involving initializing the scale, as will be discussed in greater detail later, the user may introduce the ingredients one after another into a mixing bowl or other container on the scale platform whose tare weight has been subtracted out by initially pressing the REMOVE TARE key on the keyboard. In the basic embodiment, processing is such that at first the desired volume such as a cup, a tablespoon, or a teaspoon or fractions or multiples of these measuring devices, depending on the amount of an ingredient required by the recipe, is displayed. The user adds the ingredient at a suitable pace as the scale counts up and displays the volume entered at which time it is known that the correct amount by volume of the ingredient has been introduced. The scale can also display the volume of an ingredient, and decrease the displayed volume to zero when the desired volume has been added to the scale.

In the most advanced and deluxe model of the converter scale, recipes recorded on a magnetic storage medium, or in solid state memory, can be inserted. A full alphabetic keyboard is provided for permitting keying the title of the recipe into the scale memory to retrieve the recipe from the storage medium and then displaying the ingredients in sequence with additional information such as advising the user to stir thoroughly or perform some other operation. In the most advanced model, a numeric key pad is also provided for entering code numbers to enable the converter scale to perceive that it is presently concerned with a particular type of ingredient. When the keyboard is used to introduce the name or code number and the desired volume of the ingredient required by the recipe, the processor in the scale addresses a nonvolatile memory and accesses a standardized stored volume-to-weight (V/W) ratio for the particular ingredient and the scale uses this ratio to calculate the weight of the material that corresponds to the volume specified in the recipe and which has been entered by the user through the keyboard. Then, by suitable electronic processing, an electric signal representative of weight is converted to a signal representative of its volume and this signal is used to drive a display device which displays the ingredient in terms of volume. Thus, an unconventional type of converter scale device is provided wherein, in one selected mode, when the volume of an ingredient, object or material is entered, the scale converts that volume to the weight which that volume would have and then converts it back to volume and displays the volume on the display panel or screen. To the user, it looks like the scale is simply measuring volume so the user has no old habits to break or new habits to form to be able to measure ingredients expressed in terms of volume in a recipe. In another mode the volume of an ingredient can be entered and the converter scale displays the weight.

As mentioned, the deluxe model of the scale provides for using recipes that are stored on magnetic media such as tape cassettes or in solid state memories such as in programmable read-only memories (PROMS). By pressing a REVIEW key, the user can have one ingredient in the recipe after another displayed to allow the user to determine if all of the ingredients for producing the recipe are on hand before production is undertaken.

An illustrative embodiment of the invention will now be set forth i to the drawings.

DESCRIPTION OF A PREFERRED EMBODIMENT

Figure 1:
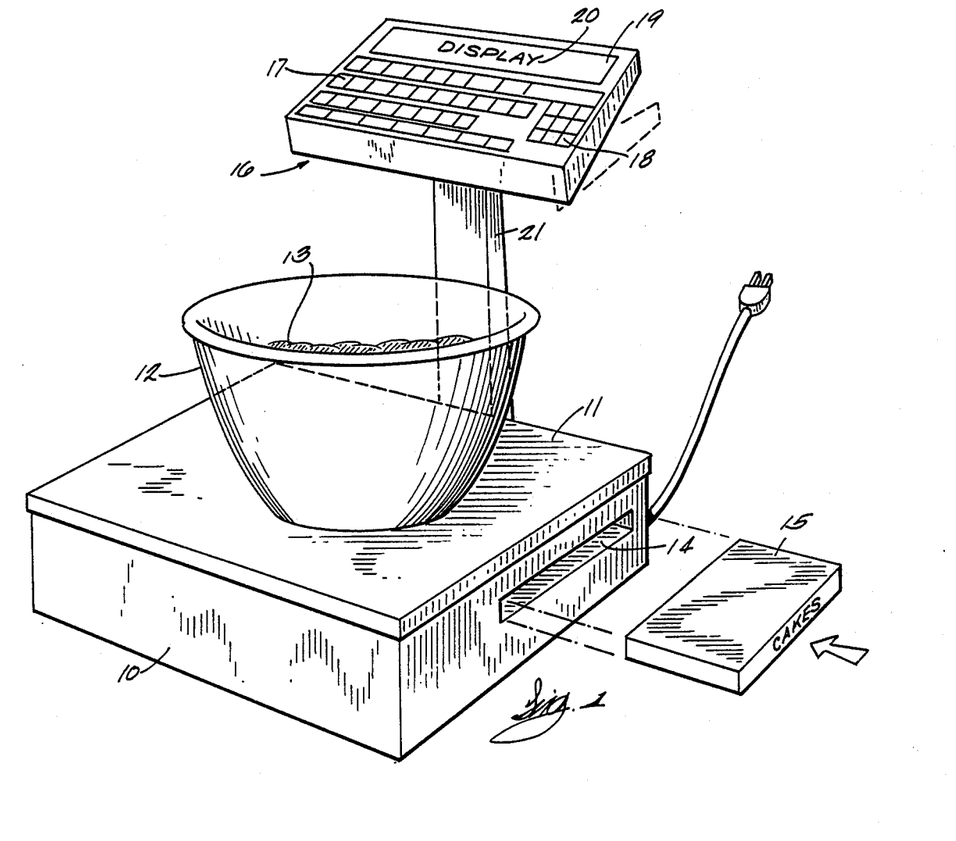
FIG. 1 is a perspective view of the new converter scale.

The embodiment of the new converter scale depicted in FIG. 1 comprises a metal or plastic housing 10. The top of the scale has a platform 11 which is otherwise called a scale pan. A mixing bowl 12 is presently standing on pan 11 and there are some ingredients 13 for fulfilling a recipe in the mixing bowl 12. The embodiment of the scale depicted in FIG. 1 is provided with an opening 14 into which a solid state electronic memory or a magnetic storage medium or device such as a disk or tape cassette 15, can be inserted so the scale can read out any of a series of recipes and other information of importance to a cook or baker which is stored on the tape. Other devices such as an easily plugged in type of programmable read-only memories (PROMS), not visible, can also be used for storage. The scale includes a keyboard mounted to a display housing 16. The keyboard has a group of keys 17 which are mostly in the format of alphabetic keys in a standard typewriter. There is also a numerical keypad 18 containing the numbers 0-9 and a decimal point as is evident in FIG. 4. There are also horizontally arranged top and bottom rows of keys which are used to enter certain instructions to the converting scale. The keyboard and display housing 16 in FIG. 1 is tiltable as suggested by the phantom lines in FIG. 1 to make reading of the keyboard and display comfortable for users of different heights. The keyboard preferably uses membrane switches rather than conventional keys. The scale also includes a display panel which is designated generally in FIG. 1 by the reference numeral 19. There are a row of digital displays 20 which can be seven-segment displays or dot matrix digital displays. The keyboard and display housing 16 is pivotally mounted to a post 21 which contains electrical conductors, not visible, for interconnecting electronic circuits in the scale housing 10 with electronic circuits in the keyboard and display housing 16.

Figure 2:
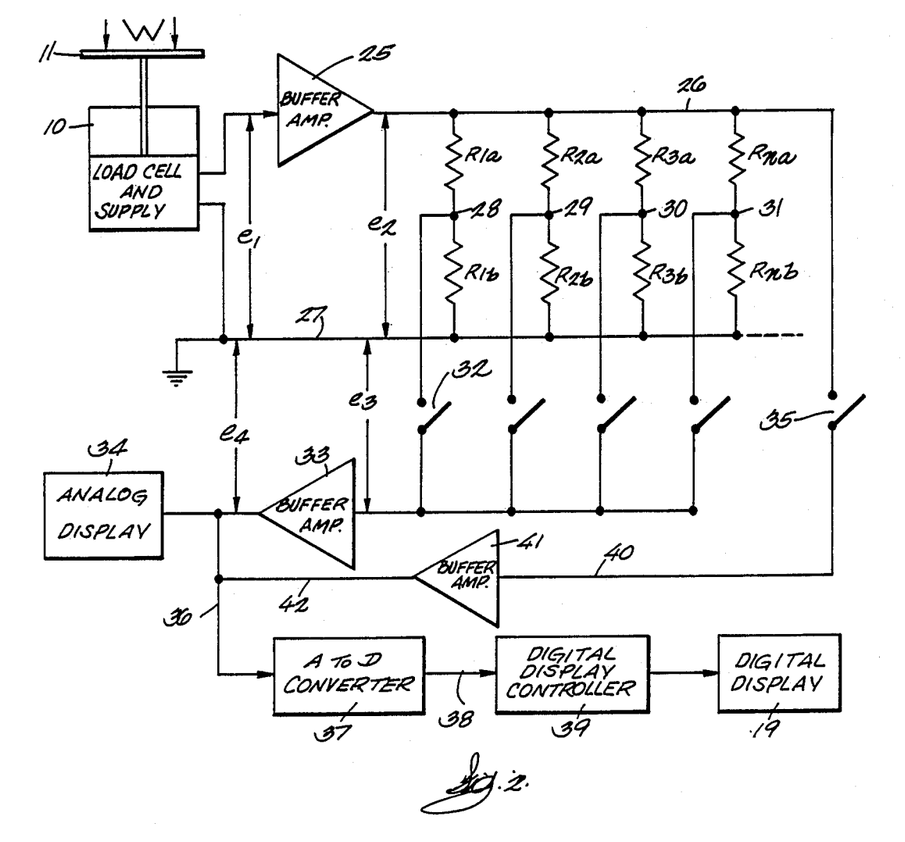
FIG. 2 is a combination schematic and block diagram of a basic scale.

Attention is now invited to FIG. 2 which is a circuit diagram of a basic volumetric-to-gravimetric-to-volumetric converter scale. The basic principles or characteristics of the FIG. 2 converter scale will be seen to apply also to the more advanced FIG. 3 embodiment. In FIG. 2, the scale pan is marked 11 as it is in FIG. 1. The scale housing 10 will be understood to contain a weight-to-electric signal transducer based on a load cell or strain gage and a power supply, not visible. Assume in this scale that the strain gages, not shown, are arranged in a bridge circuit, not shown, which is a widely used practice. As weight is added to the scale, the bridge circuit produces an output voltage signal, $e_1$, which is proportional to the weight of the ingredient or material or object on scale pan 11. This voltage signal is applied to the input of a buffer amplifier 25 which amplifies the signal and raises the signal-to-noise ratio. The amplified output voltage from amplifier 25 is represented by the symbol $e_2$. Voltage signal $e_2$ is applied between a common line 26 and system ground line 27. A plurality of resistive voltage divider circuits are connected across lines 26 and 27. They have voltage taps marked 28 through 31. These voltage dividers are adapted to provide voltage signals representative of the volume/weight (V/W) ratios of various ingredients that are regularly used in cooking and baking or in beverages or mixed drinks, depending on the speciality of the scale. Typically, there will be about 100 or even more divider circuits for providing V/W ratios for ingredients. Assume, for instance, that the voltage obtained at the tap 28 of the first divider circuit corresponds to the V/W ratio of white flour. If the user desires to add a cup of white flour to a mixing bowl, not shown in FIG. 2, standing on the scale platform or pan 11, the user presses a key operated switch 32. This connects the voltage derived at the tap point 28 of the first divider circuit to the input of a buffer amplifier 33. This voltage is represented by the symbol $e_3$. As will be shown shortly hereinafter, voltage $e_2$, which is output from the first buffer amplifier 25 corresponds to the weight of the material that is gradually being added to the bowl on the scale pan. The signals from the voltage divider tap, on the other hand, correspond to the volumes of the ingredients, such as flour, being added to the bowl on scale pan 11. The output signal from buffer amplifier 33 corresponds exactly to the volume of the ingredient and this voltage signal increases as the ingredient is added to the scale pan. The gains of buffer amplifier 33 and buffer amplifier 41 (to be described soon) are adjusted to provide the most readable output on the analog display 34.

The output signal from buffer amplifier 33 is an input to a display device 34 that can be driven by an analog voltage signal. An ordinary volt meter and bar graph display device, not shown, are examples. If a meter is used, its scale is calibrated in terms of teaspoons, tablespoons and cups and fractions of these measuring devices. So if a user desires to add, let us say, one-fourth of a cup of flour, the user would press key switch 32 to introduce the V/W ratio for flour. Then the user starts to pour flour into the bowl on the converting scale pan while watching the analog display 34 gradually increase until one-fourth cup is indicated. The user would then stop adding the ingredient. Note that the user of the converting scale did not need to use a measuring cup to determine the exact quantity of flour. The flour can just be poured or spooned out from a bag or from whatever container it is kept in.

If a user desires to simply weigh an object or material using the volumetric-to-gravimetric converter as an ordinary scale, a key switch marked 35 is closed but switches 32 are opened. This connects the voltage, $e_2$, from buffer amplifier 25 directly to the input of a buffer amplifier 41 by way of line 40. The analog meter, which is symbolized by analog display 34, also has a scale graduated in terms of ounces and pounds. The output of buffer amplifier 41 is supplied by way of line 42 to the input of the analog display or meter 34. Thus, the meter would indicate to the user the weight of the material on the scale pan. Analog display 34 could be a bar graph meter.

The computation performed by the circuitry in the basic scale of FIG. 2 is characterized as follows:

Voltage $e_1$, is proportional to the weight (W) of the material on the scale.

Voltage $e_2$ corresponds to the weight (W) of the material on the scale.

Voltage $e_3$ is the voltage at any divider tap 28-31 and corresponds to the weight (W) modified by the volume-to-weight ratio (V/W)

V/W ratio equals $$V/W \text{ ratio} = R_b/(R_a+R_b)$$

therefore:

$$e_3 = e_2 \times R_b/(R_a+R_b) \cong e_2 \times V/W \cong W \times V/W \cong V$$

(volume of materials on scale)

It will be apparent that if the W/V proportionality factors or ratios are stored instead of the V/W ratios, then the last arithmetic operation in the preceding paragraph would be $W \div W/V = V$ instead of $W \times V/W = V$.

In FIG. 2 the basic scale thus far described can be adapted for digital display of the volume units on the scale. In such case the analog display 34 is eliminated. The analog voltage signal, $e_4$, is supplied instead by way of a line 36 to the input of an analog-to-digital converter 37. The digitized signal is transmitted by way of a plurality of lines 38 to a digital display controller marked 39. The controller controls a digital display 19 whose display devices, not visible in FIG. 2, preferably comprise seven-segment bar or otherwise dot matrix displays.

Figure 3:
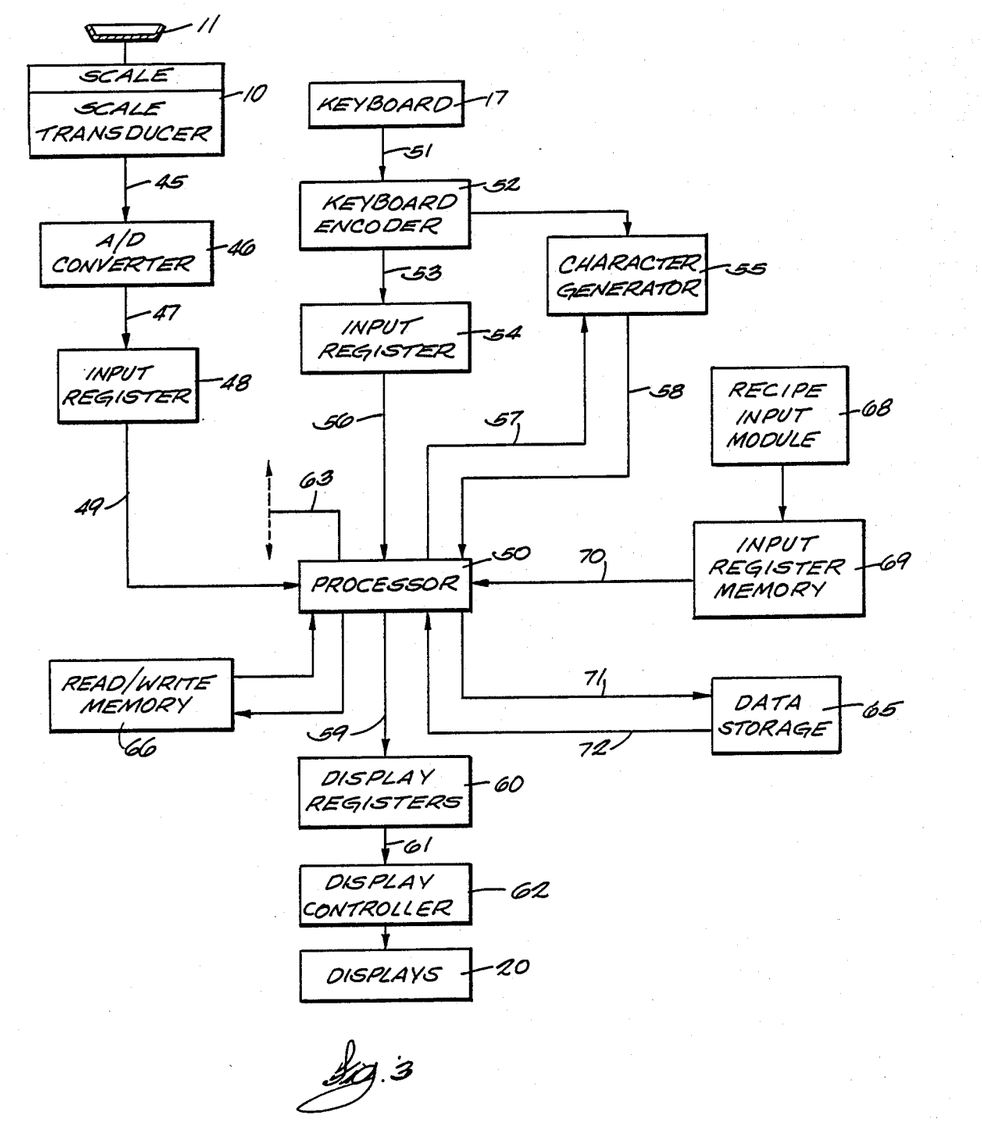
FIG. 3 is a block diagram of the electronic components used in the most advanced or deluxe model of the converter scale.
Figure 4:
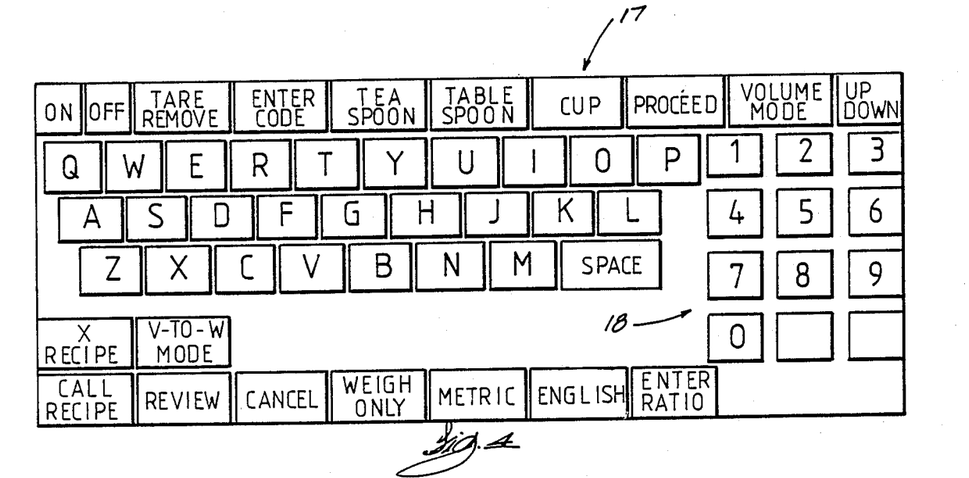
FIG. 4 is a lay-out of the keyboard which is used with the new converter scale.

Attention is now invited to FIG. 3 for describing a more advanced embodiment of the converter. In this figure the converter scale is represented generally by the numeral 10. The pan or platform of the scale is marked 11 as it was in FIG. 1. The transducer of the scale is not shown in FIG. 3 but it may be a well known type comprising a strain gage or gages, not shown, which vary their impedance in response to compressive force applied to them by the weight on pan 11. The strain gages are typically connected in a bridge circuit, not shown, which outputs an electric signal proportional to the weight applied to the strain gage or gages. The analog signal output from the transducer is supplied by way of a line 45 to an analog-to-digital converter (A/D converter) 46. The digital signal from converter 46 is conducted by a plurality of lines 47 to the input of an input register 48 for temporary storage. It will be understood that as material is added or subtracted to the scale pan 11, the value of the digital signal from converter 46 will vary correspondingly. The signal temporarily stored in input register 48 is read out of the register by a microprocessor based processor 50 by way of a plurality of lines 49. The components thus far described provide for using the converting scale in a conventional mode to simply weigh an ingredient, material or object that is placed on scale pan 11. The simple weighing mode can be elected by the user by simply pressing the WEIGH ONLY key on keyboard 17 which is depicted in FIG. 4. The keyboard is indicated by the same number in FIG. 3. Referring to FIG. 3, when the WEIGH ONLY key or any other key on the keyboard is pressed, the signal resulting is transmitted by way of a plurality of lines 51 to a keyboard encoder 52 and the encoded signals are fed by way of a plurality of lines 53 to an input register 54 in which the encoded signals are temporarily stored.

A character generator 55 is provided for converting encoded data to data representative of characters that can be used for driving a display controller. Thus, in the FIG. 3 embodiment, at appropriate times, the processor 50 accesses data constituting a code for characters by way of a plurality of lines 56. A processor transmits the necessary digital data for the characters by way of a plurality of lines 57 to character generator 55 which returns the data for characters by way of a plurality of lines 58 to the processor 50. The processor causes transmission of this data by way of multiple lines 59 to display registers 60. The character data is sent by way of multiple lines 61 to a display controller 62 which controls the digital displays to display the data. Since up to this point the components involved in displaying the weight have been discussed, it will be the weight in terms of decimal numbers that will be displayed by digital displays 20. Displays other than alphanumeric digital displays could be used. For example, well known electronic bar graphs could be used which comprise a row of light emitting diodes arranged adjacent a graduated line where the extent of the row which lights up depends on the magnitude of a signal corresponding to weight or volume.

The converting scale is programmed to weigh and display metric or English values depending whether the METRIC or ENGLISH keys are pressed on the keyboard 17 depicted in FIG. 4.

The structure and functions involved in using the new scale as a volume-to-weight-to-volume converter or, optionally, a volume input and weight display converter, in accordance with the invention, will now be discussed in greater detail in reference to FIG. 3. First of all it should be noted that all of the electronic components represented by the functional blocks in the FIG. 3 block diagram are controlled by a control bus which is marked 63 and would run from the processor 50 to each of the blocks in the diagram.

In FIG. 3, there is a block 65 that is also labeled data storage. This data storage is comprised of one or more programmable read-only memories (PROMS). Besides the program or instruction set for controlling processor 50, the data storage PROMS, in accordance with the invention, also store conversion or proportionality factors in the form of volume-to-weight ratios or, alternatively, weight-to-volume ratios which the processor needs to convert inputted weight units to volume units for display or inputted volume units to weight units for display. There is a read/write memory 66 coupled to processor 50 which is used as a temporary storage or scratch pad when the processor is calculating. In the PROMS of the data storage unit 65 it is easy to store the volume-to-weight (V/W) ratios or, alternatively, weight-to-volume (W/V) ratios for a thousand different ingredients used in cooking and baking if desired. Because the Department of Agriculture tables give the weight of one 237 ml standard cup for almost any conceivable recipe ingredient, it is convenient to calculate the V/W ratios based on cups. Since it is accepted that one tablespoon is equivalent to approximately 15 ml and one teaspoon is equivalent to approximately 5 ml, suitable conversion factors or multipliers can also be stored in the data storage unit 65. One tablespoon is equivalent to 3 teaspoons and one cup is equivalent to 16 tablespoons according to a specification of the National Bureau of Standards. If the user contemplates adding an ingredient to the mixing bowl 12, in terms of a teaspoon, tablespoon or cup measurement, the user will press either the TEASPOON, TABLESPOON or CUP keys on the keyboard 17 before starting to pour the ingredient into the mixing bowl 12. If a fraction of any of the measuring units just mentioned is used, such as one-fourth of a teaspoon of an ingredient, after the TEASPOON key is pressed, the numeric key pad 18 on the keyboard of FIG. 4 is used to indicate to the processor that 0.25 teaspoon of the ingredient is needed. The arithmetic-logic unit, not shown, in the processor does the calculating to assure that the volume of the ingredient in decimal or integer form is displayed as required on the display panel 19.

If the user is contemplating producing a recipe, the first step that the user will take is to press the ON key on the keyboard of FIG. 4 to energize the converter electronics. Next, the VOLUME MODE key is pressed if entered volumes are to be displayed in terms of volume. The ENGLISH key is next pressed if the recipe book indicates the volumes of the various ingredients in English measurement units. The user then places a mixing bowl on scale pan 11. After that the TARE REMOVE key is pressed. This results in automatically nullifying the weight of the bowl and display 20 will show zeros.

When the user is ready to proceed with carrying out the recipe, the PROCEED key on the keyboard is pressed. Next the ENTER CODE key is pressed. The user is provided with a manual or chart which assigns a code number to every ingredient that one can imagine would be necessary for producing any but the most exotic recipe. The user enters the code number of the first ingredient that is to be put in the mixing bowl, using numeric key pad 18 which is similar to the key pads found on hand held calculators. Data representing the ingredient is encoded and fed through input register 54 to processor 50 which, among other things, accesses the V/W ratio for the particular ingredient to perform the calculations which are necessary to cause the volume rather than the weight of the ingredient to be displayed.

Assume the first ingredient is a commercial biscuit mix. According to the United States Department of Agriculture Home Economics Research Report No. 41, issued March, 1977, the weight of one cup volume of biscuit mix is 116 grams which, according to the invention, the user of the scale actually does not need to know. Since a standard cup has a volume of 237 ml the V/W ratio for biscuit mix is 237 ml divided by 116 grams which equals 2.043. This is the ratio stored in PROM data storage 65 for biscuit mix along with V/W ratios for many other ingredients. Other common volume measurements used in recipes are tablespoons and teaspoons and fractions of these. Consequently it is necessary to have multipliers available for processor 50 to convert these measurements and fractions of them in terms of cups. As indicated, a tablespoon equals approximately 15 ml which is equivalent to 15 divided by 237=0.0633 of a cup. However, the National Bureau of Standards has established that there are exactly 16 tablespoons in one cup. Since 1/16=0.0625, the multiplier held in data storage 65 for converting tablespoons to cups is preferably 0.0625. Using the same standard, there are exactly three teaspoons in one tablespoon and 0.0625÷3=0.020833. So 0.020833 is the multiplier for converting teaspoons to cups. This multiplier is held in storage. So if the user contemplated adding one-half (0.5) cup of biscuit mix to the mixing bowl 12, the decimal point and 5 on the numeric key pad would be pressed, the "CUP" key on keyboard 17 would be pressed, and then the code number for biscuit mix would be entered using numeric key pad 18. If one or more ingredients had already been measured and put into mixing bowl 12, there could be a volume displayed on the display panel. Thus, after each ingredient is put in the bowl, the TARE REMOVE key is pressed and zeros are displayed on the display panel 19. Since the code for biscuit mix has been entered, the user would simply pour the biscuit mix into mixing bowl 12 without the need for premeasuring the ingredient in a measuring cup. As the user poured the biscuit mix from a package or bag, the value of the volume displayed in terms of a decimal fraction would be increasing gradually. Eventually one-half (0.5) cup would be displayed and the user would stop adding any more biscuit mix. The TARE REMOVE key would then be pressed to cause all zeros to be displayed on the display panel 19.

If, for example, adding one-half tablespoon of biscuit mix, were desired instead of pressing the "CUP" key as in the preceding example, the "TABLESPOON" key on keyboard 17 would be pressed. Biscuit mix would then be added until the display showed 0.5 again.

Of course, the functions described earlier would be carried out by the circuitry in FIG. 3 each time a function is initiated by using the keyboard 17. Thus, a code number for designating an ingredient would be encoded by encoder 52 and placed in input register 54 for being accessed by the processor 50 as needed for carrying out the volume-to-weight-to volume conversion and displaying the increasing volume of the ingredient on display panel 20 as the ingredient is being added to the mixing bowl.

The scale can be operated in a reverse display mode wherein, instead of all zeros being displayed when an ingredient volume has been entered as just described, the numerical value of the volume is displayed at the onset. Then, as the ingredient is added onto the scale, the displayed volume is counted down until zeros are displayed which signals the user that the required quantity has been added. The counting up mode discussed in the preceding paragraph or the counting down to zero mode just discussed can be selected by the user pressing the UP/DOWN key on keyboard 17 successively in which case the scale switches from one mode to the other.

When an ingredient is measured in terms of cups or fractions of a cup, the processor 50 is not required to access and apply any multiplier to the volume-to-weight (V/W) ratio. For practically all ingredients, the user does not have to resort to any measuring device such as a cup, tablespoon, teaspoon or fractions of these measuring units because in most cases, the ingredient can be put in the mixing bowl directly from the package or container in which it was purchased.

In the deluxe model, provision is made for accessing recipes that are stored in a plug-in solid state memory. Storage could be on a magnetic medium such as on magnetic tape in a cassette. Storing on a magnetic tape cassette is discussed herein for illustrative purposes. A cookbook is provided with this more advanced model which has many hundreds of recipes printed in human readable form as is the case in ordinary recipe books. Data representative of these recipes is stored in a library of tape cassettes which can be inserted into opening 14 in FIG. 1 for being read out by the electronics in the scale. If recipes are stored in other media such as PROMS or ROMS as is preferable, various classes of recipes such as cakes, cookies, etc., the PROMS or ROMS of the plug-in type must be preprogrammed by the scale manufacturer or other vendor. The particular cassette 15 depicted in FIG. 1 is labeled "cakes" to indicate that it has many recipes for cakes. Every recipe in the cookbook and, hence, in the cassette 15 for cakes has an identification number which is in decimal form. The user after having chosen the recipe presses the CALL RECIPE key and inputs its code number by way of numeric key pad 18. The cassette is then driven until where the recipe begins and it is then ready for read out. The user has the option of reviewing the entire recipe to determine if all ingredients are on hand before production of the recipe is begun. If a review is desired, the REVIEW key on the keyboard is pressed. The first ingredient in the recipe is then displayed. The user may then check to see if the ingredient is on hand. This procedure is repeated until the entire recipe is reviewed. Each time the user wants to see the next ingredient, the REVIEW key is pressed. At the end of the review, the user presses the PROCEED key on the keyboard and the tape automatically rewinds to the point where the beginning of the recipe is in position for being read out. A similar return to the beginning would take place if the recipes were stored on disk, ROMS or PROMS. Assuming that the VOLUME MODE key had been pressed, and that the TARE REMOVE key had been pressed to cause all zeros to be displayed, the user can then proceed with producing the recipe in a step-by-step fashion.

The recipe input module in which the cassette 15 is inserted through opening 14 in FIG. 1 is shown in block form and given the numeral 68 in FIG. 3. When a recipe is called by way of the keyboard, processor 50 through its control and address bus 63 communicates with the per-recipe input module and causes the latter to position the recipe for read out. The recipe input module delivers the encoded recipe items and procedures to the recipe input register memory 69 which communicates with processor 50 by way of multiple lines 70. If the processor needs data from data storage 65, it can address storage 65 by way of multiple lines 71 and the data can come back to the processor by way of multiple lines 72. In the model that provides for stored recipes, when the ingredient that is to be entered next into the mixing bowl is called from the storage medium, the processor brings about a display on display panel 19 of the amount of the ingredient and the name of the ingredient that is to be added. For instance, the recipe may call for three tablespoons of syrup and, using the deluxe model, information indicative of volume, V, would appear on the display 20. The user would then pour syrup into the mixing bowl and watch the volume amount being displayed reduced to zero at which time the user would, of course, discontinue adding syrup. By pressing the UP/DOWN key on keyboard 17 one time after the name of ingredient is displayed, the display could have been returned to all zeros in which case the display would count up and adding syrup would be discontinued when 3.00 appeared on the display.

Another feature of one model of the new converter which stores on cassette is the ability to record any recipe the user desires. In such case the ON key is pressed to activate the scale. Then the RECORD key is pressed to provide a signal to said processor which conditions it for operating in a recording mode and next the ENTER CODE key is pressed. The user must use a code number that is not otherwise used in the book of recipes that match the recipes recorded on the various cassettes. After the code is entered, the user can use the keyboard to type in the name of the recipe and a listing of all its ingredients plus procedures that have to be followed such as stir, shake, heat and so forth. When the recipe is completely recorded on the cassette, the cassette can be removed and if it is reinserted to perform the recipe, the ENTER CODE key will be pressed and then the code number of the recorded recipe is entered by means of key pad 18 in which case the processor causes the cassette to be driven until the recipe identified by that code number is ready for read out. After that, the procedure for producing the recipe is the same as in the case where recipes had been prestored on cassettes that appear in a manual or cookbook provided by the scale manufacturer which recipes are also stored on magnetic tape.

There are times when a user of the converter scale will want to make a multiple quantity or a fractional quantity of a recipe. In such cases, after PROCEED key is pressed, a key marked X RECIPE is pressed to inform the processor that a multiple of the next selected recipe or a fraction thereof is to be prepared. Assume, for example, that the recipe is to be doubled. The user presses the X RECIPE key and then enters "2" by way of numeric key pad 18. The processor would then go into a mode which would automatically call for twice the normal amount of all ingredients. If a fractional recipe is desired such as 2/3 of a recipe, "0.66" is entered by way of the numeric key pad 18 after the X RECIPE is pressed.

In the foregoing discussion when a user of the converter scale designated an ingredient of a recipe the user commanded that the volume of the ingredient be displayed in terms of volume. Thus, at the outset of performing a recipe the user would have pressed the VOLUME MODE key on keyboard. Then the user would have pressed the ENTER CODE key followed by entering the code number of the ingredient using numeric key pad 18. After choosing one of the volume keys, such as TABLESPOON, the number of tablespoons or fraction thereof would be designated using the key pad. Then the processor would cause the name of the ingredient and the quantity in the designated volumetric terms, such as 2 TBSP, would be displayed if "2" had been entered using the pad 18. Then, depending on the sequence selected by using the UP/DOWN key, the display would either increase the volume value up to "2" or, alternatively, decrease volume from "2" down to zero as the ingredient is added. Of course the TAR REMOVE key is pressed before adding each new ingredient.

Another feature of the new converter scale is to facilitate entering the volume of a particular ingredient called for in the recipe and have the weight of that volume of the ingredient displayed instead of its volume as in the preceding paragraph. This is accomplished by pressing the V-TO-W MODE key before the volumetric quantity is entered using the key pad 18. Pressing the V-TO-W MODE key blocks the result of the VOLUME MODE key having been pressed previously if that is the case. Except for pressing the V-TO-W key to obtain weight display instead of volume display, the other operations carried out in connection with adding an ingredient are similar to those described in the preceding paragraph.

The volume-to-weight conversion and weight display discussed in the preceding paragraph is not to be confused with the WEIGH ONLY mode. In the latter mode any material can be placed on the scale pan and the absolute value of the weight in metric or English units will be displayed. The processor does not need the V/W ratios for the direct weighing mode. In the V-TO- W mode, however, the processor must access the V/W ratio or conversion factor for the particular material and use the factor to calculate the weight of the designated volume of one specific material and display this weight after having been informed of the volume of the ingredient.

When a user desires to add an ingredient to a recipe whose V/W ratio or conversion factor is not in storage, the user, as a first step involved in adding the ingredient, presses the ENTER CODE key and then enters the proper code number for the new ingredient using the key pad 18. Next the user uses the keyboard to type in the name of the ingredient and the processor addresses it to storage. Finally, the user presses the ENTER RATIO key to enter the related V/W ratio or conversion factor into memory along with the code number and name of the ingredient. After that the volume or weight of the new ingredient can be entered in the usual way as the ingredient comes up for being added in accordance with the recipe.

Although embodiments of the invention have been described in detail, such description is intended to be illustrative rather than limiting, for the invention may be variously embodied and is to be limited only by interpretation of the claims which follow.

I claim:

1. A converter scale comprising:
   transducer means for producing an electric signal (W) corresponding to the weight of a material placed on the scale,
   means for converting said signal (W) corresponding to weight to a signal (V) corresponding to the volume of said material, and
   display means responding to said signal (V) corresponding to volume by displaying information indicative of said volume.

2. The converter scale according to claim 1 wherein:
   said means for converting said signal (W) corresponding to the weight of the material placed on the scale device to a signal (V) corresponding to the volume of said material comprises a plurality of voltage divider means each including resistor means having corresponding first and second ends respectively connected in common, the first of said common connections constituting the input for said signal (W) corresponding to weight such that the voltage drop across the respective resistor means corresponds to said signal (W) resulting from the weight of said material placed on said scale device,
   a tap intermediate the ends of each resistor means for deriving a signal from the resistor means, respectively, corresponding to the volume of a material placed on the scale device, the resistance value being selected such that in any one of the resistor means the ratio of the resistance between the tap and said second end of the same resistor means and the total resistance of said resistor means results in a signal (V) from the tap which corresponds to the volume of the material placed on the scale device.

3. The converter scale according to any one of claims 1 or 2 wherein said means responding to said signal (V) corresponding to volume comprises an analog display device having input means to which said signal (V) is coupled and which responds to said signal by indicating the value of the volume of said material placed on the scale.

4. The converter scale according to any one of claims 1 or 2 wherein said means responding to said signal (V) corresponding to volume comprises:
   an analog-to-digital converter (ADC) having input means for said signal (V) and having output means for the digitized signal (V),
   digital display controller means having input means coupled to the output means of said ADC and having output means,
   said display means comprising digital display means having input means coupled to the output means of said controller means, said display means displaying information indicative of the volume of material placed on the scale.

5. The converter scale according to claim 3 comprising circuit means for coupling said electric signal (W) corresponding to the weight of the material on the scale to said input means of said analog display device and including means for uncoupling said signal (V) to said input means for said display device to indicate the weight of said material.

6. The converter scale according to claim 4 comprising circuit means for coupling said electric signal (W) corresponding to the weight of the material on the scale to said input means of the ADC for said digital display to indicate the weight of the material.

7. A converter scale comprising:
   transducer means for generating a signal (W) corresponding to the weight of a material that has been placed on the scale,
   storage means for storing signals corresponding to the weight and volume proportionality factors of a plurality of different materials,
   processor means operative to combine, respectively, said signals (W) and said signals corresponding to said proportionality factors pertaining to materials placed on the scale to yield a signal (V) corresponding to the volume of the materials on the scale,
   keyboard means and means for coupling said keyboard means to said processor means to provide informational signals to said processor means in response to manual operation of keys on said keyboard means,
   said keyboard means including keys operable selectively to supply signals to said processor means to identify a material to be placed on the scale and operable to supply signals indicative of requesting that it is desired to display information indicative of the weight or, alternatively, the volume of the material that is to be placed on the scale, and
   display means, said processor means utilizing said signals (W) or (V) to control said display means to display information indicative of the weight of said material when a key has been operated requesting that the weight of the material be displayed and to display information indicative of the volume of the material when a key has been operated requesting that information indicative of volume be displayed.

8. The converter scale according to claim 7 wherein said signals which are stored corresponding to the proportionality factors of materials are signals representative of the volume-to-weight (V/W) ratios of the materials.

9. The converter scale according to claim 7 wherein said signals which are stored corresponding to proportionality factors of materials are signals representative of the weight-to-volume (W/V) ratios of the materials.

10. The converter scale according to any one of claims 7, 8 or 9 adapted for performing multiple and fractional batches of recipes and the like wherein:

said keyboard means includes keys operable to provide a signal to the processor means indicative, respectively, of a multiple or a fraction of a recipe being desired and said keyboard having numeric keys operable to provide signals to said processor corresponding to the multiple or fraction desired, said processor means responding to entry by way of said keyboard the identification and volume of ingredients in the recipe by multiplying the volume of the ingredient specified in the recipe being performed by the desired multiple or fraction and causing the result to be displayed.

11. The converter scale according to any one of claims 7, 8 or 9 including circuit means for coupling said signal (W) to said display means for displaying information representative of the weight of material added to the scale.

12. The converter scale according to any one of claims 7, 8 or 9 wherein:

said keyboard means has keys manually operable to generate digital signals representative of the identity of materials, respectively, which are placed on said scale for making a weight determination, means for coupling a said generated digital signal indicative of the identity of a material to said processor means, said processor means responding by accessing from storage the signal representative of the proportionality factor for the identified material, an analog-to-digital converter (ADC) having input means for said signal (W) and having output means, means coupling said output means of said ADC to said processor means to provide said signal (W) which represents the weight of the material to said processor means, said processor means responding to input of said signal representative of said proportionality factor and input of said signal (W) by combining said signals to produce said signal (V).

13. The converter scale according to any one of claims 7, 8 or 9 including:

storage means in which one or more recipes are recorded, entry of information for identifying a recipe by way of operating said keyboard means causing said processor means to access said recipe, and entry of information for effecting review of said recipe by way of operating said keyboard means causing said processor means to effect display of the components of said recipe on said display means.

14. The converter scale according to any one of claims 7, 8 or 9 wherein:

said keyboard means includes a key which, when operated while matter constituting a tare weight is on said scale, causes said processor means to subtract the tare weight so no indication of the weight of the matter on the scale is displayed on said display means.

15. The converter according to any one of claims 7, 8 or 9 wherein:

said keyboard means includes keys for entering code numbers identifying, respectively, the materials whose proportionality factor signals are stored in said storage means.

16. The converter scale according to any one of claims 7, 8 or 9 wherein:

said keyboard means includes keys manually operable to generate digital signals representative, respectively, of the identity and desired volume of a specified material, said keyboard means including a key which is manually operable to provide alternate signals to said processor means to one of which signals said processor means responds by controlling said display means to display an indication of the value of the said desired volume initially and by controlling said display means to decrease said display volume indication value toward zero as said specified material is being added to the scale and to display an indication of zero value when said desired volume is accumulated on said scale, said processor means responding to the other of said alternate signals by controlling said display means to display an indication of zero volume initially and by controlling said display means to display an increasing volume indication as said material is being added to the scale to inform the user to stop adding material when an indication of said desired volume is displayed.

17. The converter scale according to any one of claims 7, 8 or 9 wherein:

said keyboard means includes key means operable to provide signals for conditioning said processor means to store signals generated by operating said keyboard means for encoding the identification of a new material not previously stored in said storage means and for entering the proportionality factor signal for said new material.

18. The converter scale according to any one of claims 7, 8 or 9 wherein:

said keyboard means includes a key operable to provide a signal to said processor means to convert a volume value for a material whose identification signal has been entered by way of said keyboard means to a signal (W) representative of the weight of the entered volume of the material and using said signal (W) to control said display means to display information indicative of the weight of said volume of material.

19. The converter scale according to any one of claims 7, 8 or 9 including:

storage means for storing recipes and the like, a key on said keyboard means operable to provide a signal for conditioning said processor means for operating in a recording mode, said keyboard means also including a key operable to indicate that the code will be entered next for identifying a new recipe that is to be added to said means for storing recipes, said new recipe then being entered by typing in its ingredients using said keyboard means.

20. A converter scale comprising:

transducer means for generating a signal (W) corresponding to the weight of material placed on the scale, storage means for storing signals corresponding to the weight and volume proportionality factors of a plurality of different materials, keyboard means and processor means and means for coupling signals to said processor means produced by manually operating keys on said keyboard means, operating predetermined keys on said keyboard means generating digital signals corresponding to the identity of materials, respectively, which may be placed on said scale and digital signals indicative of the specified volume of the material to be placed on said scale, said processor means operating to combine proportionality factor signals pertaining to a material to be placed on said scale and said signals from said keyboard corresponding to the specified volume of said material to yield a signal (X) corresponding to the weight of the specified volume of said material, display means and means coupling said processor means to the display means, said display means responding to input of said signal (X) by displaying information indicative of the specified weight to be placed on the scale and said display means responding to input of said signal (W) by displaying information indicative of the weight of the material placed on said scale.

21. The converter scale according to claim 20 wherein said signals corresponding to the proportionality factors of the materials which are stored are signals representative of the volume-to-weight (V/W) ratios of the materials.

22. The converter scale according to claim 20 wherein said signals corresponding to the proportionality factors of the materials which are stored are signals representative of the weight-to-volume (W/V) ratios of the materials.

23. A method of producing recipes in which the ingredients composing the recipe are expressed in volumetric units, comprising the steps of:

storing in a storage device signals corresponding to volume and weight proportionality factors of ingredients specified in recipes, having a scale on which a specified ingredient is placed producing a signal (W) corresponding to the weight of the selected ingredient, having a processor combine the signal (W) and the proportionality factor signal for the selected ingredient to produce a signal (V) corresponding to the volume of the ingredient, and using the signal (V) to actuate a display device to display an indication of the volume of said ingredient on the scale.

24. The method according to claim 23 including the step of:

having a container placed on said scale for receiving the selected ingredient, before placing an ingredient in said container actuating the processor to cancel the weight of said container so the display indicates zero.

25. The method according to any one of claims 23 or 24 wherein the ingredient selected is added gradually for being weighed by the scale device and adding the ingredient is discontinued when the volume of the ingredient specified in the recipe appears on the display.

* * * * *